(12) United States Patent
Ishii (10) Patent No.: US 9,211,930 B2
(45) Date of Patent: Dec. 15, 2015

(54) FUEL SUPPLY SYSTEM FOR MOTORCYCLE

(75) Inventor: Tsubasa Ishii, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 312 days.

(21) Appl. No.: 12/882,420

(22) Filed: Sep. 15, 2010

(65) Prior Publication Data

US 2011/0073075 A1    Mar. 31, 2011

(30) Foreign Application Priority Data

Sep. 29, 2009  (JP) ................................. 2009-224099

(51) Int. Cl.
*B62J 37/00* (2006.01)
*B62M 7/02* (2006.01)

(52) U.S. Cl.
CPC .. *B62J 37/00* (2013.01); *B62M 7/02* (2013.01)

(58) Field of Classification Search
CPC ............. B62M 7/06; B62M 7/02; B62J 37/00
USPC .................................. 123/445, 457, 510–511
See application file for complete search history.

(56) References Cited

U.S. PATENT DOCUMENTS

| | | | | |
|---|---|---|---|---|
| 4,413,700 A * | 11/1983 | Shiratsuchi | ................... | 180/219 |
| 5,154,148 A * | 10/1992 | Pyzik | ........................ | 123/195 A |
| 5,533,478 A * | 7/1996 | Robinson | ...................... | 123/510 |
| 5,649,561 A * | 7/1997 | Brandt | ..................... | 137/115.13 |
| 6,357,424 B1 * | 3/2002 | Sonoda et al. | ................. | 123/509 |
| 6,779,620 B2 * | 8/2004 | Taniguchi et al. | ............ | 180/219 |
| 6,866,029 B1 * | 3/2005 | Clarkson et al. | .............. | 123/509 |
| 7,168,414 B2 * | 1/2007 | Harvey | .......................... | 123/509 |
| 7,306,715 B2 * | 12/2007 | Kato et al. | ..................... | 210/136 |
| 7,513,243 B2 * | 4/2009 | Nakagawa et al. | ............ | 123/509 |
| 7,571,714 B2 * | 8/2009 | Miyashiro | ...................... | 123/470 |
| 7,617,901 B2 * | 11/2009 | Takahashi et al. | ............ | 180/219 |
| 7,644,703 B2 * | 1/2010 | Fujita | ............................ | 123/509 |
| 7,775,191 B2 * | 8/2010 | Hou | ............................... | 123/458 |
| 8,100,113 B2 * | 1/2012 | Sugiyama | ..................... | 123/509 |
| 8,371,270 B2 * | 2/2013 | Ishii | .............................. | 123/510 |
| 8,459,236 B2 * | 6/2013 | Ishii et al. | ..................... | 123/509 |
| 2007/0102216 A1 * | 5/2007 | Satake et al. | .................. | 180/219 |
| 2008/0210203 A1 * | 9/2008 | Sugiyama | ..................... | 123/509 |
| 2009/0217911 A1 * | 9/2009 | Yokura et al. | ................. | 123/457 |
| 2011/0056465 A1 | 3/2011 | Yokura et al. | | |
| 2011/0073073 A1 * | 3/2011 | Ishii | .............................. | 123/445 |

FOREIGN PATENT DOCUMENTS

| | | | | | |
|---|---|---|---|---|---|
| JP | 2005096504 A | * | 4/2005 | .............. | B62J 35/00 |
| JP | 2008-248753 A | | 10/2008 | | |
| JP | 2009-209909 A | | 9/2009 | | |

* cited by examiner

*Primary Examiner* — Stephen K Cronin
*Assistant Examiner* — Carl Staubach
(74) *Attorney, Agent, or Firm* — Birch, Stewart, Kolasch & Birch, LLP (57) ABSTRACT

The motorcycle includes a power unit having a crankcase of an internal combustion engine, the fuel injection system mounted to the power unit, a fuel tank, a fuel pump unit by which fuel in the fuel tank is supplied to the fuel injection system, and the fuel filter device. The fuel supply system for the motorcycle includes the fuel filter device that is cylindrical in shape, the pressure regulator cylindrical in shape is mounted to an outside portion of the fuel filter device, with its cylinder axis inclined against the cylinder axis of the fuel filter device. A fuel pipe extends from an outlet pipe of the pressure regulator to the fuel injection system in a connecting manner.

18 Claims, 11 Drawing Sheets

FUEL SUPPLY SYSTEM FOR MOTORCYCLE

CROSS-REFERENCE TO RELATED APPLICATIONS

The present application claims priority under 35 USC 119 to Japanese Patent Application No. 2009-224099 filed on Sep. 29, 2009 the entire contents of which are hereby incorporated by reference.

BACKGROUND OF THE INVENTION

1. Field of the Invention

The present invention relates to a fuel supply system for a motorcycle. More particularly to a fuel supply system in which a space saving can be achieved in regard to the installation space thereof. Thus, the length of a fuel pipe can be optimized.

2. Description of Background Art

A fuel supply system for a motorcycle is known wherein a pressure regulator is disposed inside a casing of a fuel filter device. See, for example, Japanese Patent Laid-open No. 2008-248753 (FIGS. 1 to 3, and 7).

However, a fuel supply system for a motorcycle having a pressure regulator disposed inside a casing of a fuel filter device, as shown in Japanese Patent Laid-open No. 2008-248753 (FIGS. 1 to 3, and 7), has a problem in that, depending on the layout of the fuel filter device and a fuel injection system, there may be cases where it is troublesome to lay around a fuel pipe from the fuel filter device to the fuel injection system and it is difficult to obtain an optimum pipe length.

More particularly, in the case of a motorcycle using a gasoline-ethanol mix fuel as described in Japanese Patent Laid-open No. 2008-248753 (FIGS. 1 to 3, and 7), the length of the fuel pipe between a fuel filter device and a fuel injection system must be optimized so as to secure a buffer capacity for permitting a fuel injection control device to appropriately recognize a change in the composition of the fuel supplied to the fuel injection system upon a change made in the ethanol concentration according to the operating conditions.

SUMMARY AND OBJECTS OF THE INVENTION

It is an object of an embodiment of the present invention to provide a fuel supply system for a motorcycle in which a space saving can be achieved, notwithstanding a pressure regulator is disposed outside a casing of a fuel filter device. Thus, the length of a fuel pipe connected to a fuel injection system can be optimized.

In order to attain the above object, according to an embodiment of the present invention, a fuel supply system for a motorcycle includes a power unit having a crankcase of an internal combustion engine, a fuel injection system mounted to the power unit, a fuel tank, a fuel pump unit by which a fuel in the fuel tank is supplied to the fuel injection system, and a fuel filter device, wherein the fuel filter device is cylindrical in shape; a pressure regulator cylindrical in shape is mounted to an outside portion of the fuel filter device, with its cylinder axis inclined against a cylinder axis of the fuel filter device; and a fuel pipe extends from an outlet pipe of the pressure regulator to the fuel injection device in a connecting manner.

According to an embodiment of the present invention, the fuel injection system is mounted on a throttle body mounted to the power unit, and the pressure regulator is disposed between the throttle body and the fuel filter device so as to overlap with the throttle body when viewed in a vehicle width direction.

According to an embodiment of the present invention, the fuel pipe extends from the outlet pipe of the pressure regulator to the fuel injection system in a connecting manner and is so provided as to wind around an outer case of the fuel filter device.

According to an embodiment of the present invention, the pressure regulator is fixed to the outer case of the fuel filter device in a condition in which its body part is seated on a base part provided at the outer case, and its side surface on the side opposite to the outer case is covered with a cover part attached to the outer case.

According to an embodiment of the present invention, the pressure regulator is disposed directly under the fuel tank in a condition in which its cylinder axis is oriented in a vertical direction, a fuel return pipe for returning the fuel to the fuel tank is attached to its upper portion, and the outlet pipe is arranged at its lower portion.

According to an embodiment of the present invention, an outer case of the fuel filter device includes a support part side case provided on an inner side in a vehicle width direction and a cover part provided on an outer side in the vehicle width direction and covering the support part side case, in a condition where the fuel filter device is mounted on the motorcycle; the support part side case is supported by an engine hanger boss, which is for fixing the power unit to a body frame of the motorcycle, and the crankcase; and the cover part is fixed to the support part side case in a condition in which a claw portion provided on its one end side is inserted into the support part side case and its other end side is fastened to the support part side case by a fastening bolt.

According to an embodiment of the present invention, the fuel pipe is so provided as to wind around the outer case of the fuel filter device and is supported, by a pipe support part provided at the outer case, onto the outer case so as to be adjacent to a head portion of the fastening bolt in a bolt axis direction.

According to an embodiment of the present invention, the pressure regulator is not incorporated in the fuel filter device. Therefore, the outlet pipe of the pressure regulator can be laid out at an optimum position in relation to the fuel pipe. In addition, since the cylinder axis of the pressure regulator is inclined against the cylinder axis of the fuel filter device, the fuel pipe can be laid around easily, and the length of the fuel pipe can be optimized easily. Moreover, with the pressure regulator mounted to the outside of the fuel filter device, a space saving can be achieved notwithstanding the fact that the pressure regulator is disposed outside the fuel filter device.

According to an embodiment of the present invention, protection of the pressure regulator is facilitated and the appearance of the motorcycle is enhanced, since the pressure regulator is disposed so as to be hidden when externally viewed in the vehicle width direction.

According to an embodiment of the present invention, the length of the fuel pipe from the outlet pipe of the pressure regulator to the fuel injection system can be secured. Thus, optimization of the pipe length can be achieved. In addition, the fuel pipe can be laid out in a space-saving manner, since it is laid along the fuel filter device.

According to an embodiment of the present invention, the pressure regulator is supported by a simple structure. Thus, the pressure regulator is protected.

According to an embodiment of the present invention, both the fuel return pipe between the pressure regulator and the fuel tank and the fuel pipe between the pressure regulator and the fuel injection system are laid out in a space-saving manner, and the length of the fuel pipe is secured.

According to an embodiment of the present invention, the fuel filter device is firmly supported because the support part side case on the inner side in the vehicle width direction is supported by the engine hanger boss and the crankcase. In addition, since the cover part is fixed to the support part side case by a claw portion and a fastening bolt on the outside in the vehicle width direction, the cover part can be mounted and dismounted easily, and maintenance and replacement works for a fuel filter element and the like are facilitated.

According to an embodiment of the present invention, the fastening bolt is prevented from slipping off even when loosened, since the fuel pipe set winding around the outer case is supported by a pipe support part in such a manner as to be adjacent to a head portion of the fastening bolt in a bolt axis direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 11(a) is a sectional side view taken along arrows XIa of FIG. 11(b).

DETAILED DESCRIPTION OF THE PREFERRED EMBODIMENTS

A fuel supply system for motorcycle according to an embodiment of the present invention will now be described below, based on FIGS. 1 to 11(b).

In each of the drawings, apparatuses and members are partly cut out, and apparatuses and members other than major ones in the present invention are omitted together with fenders, covers, etc.

Small arrows added to apparatuses or pipes in each drawing show schematically the flow direction of a fuel.

In addition, the directions such as front, rear, left, right, up, down, etc. in the descriptions herein are according to the direction of a vehicle (motorcycle) in the condition where the motorcycle is provided with the fuel supply system for a motorcycle according to this embodiment.

In the drawings, arrow FR indicates the front side of the vehicle, LH indicates the left-hand side of the vehicle, RH indicates the right-hand side of the vehicle, and UP indicates the upper side of the vehicle.

The phrase "a vertical direction" herein is not limited to the strictly vertical direction but widely includes those directions in which the vertical component is greater than the horizontal component.

Figure 1:
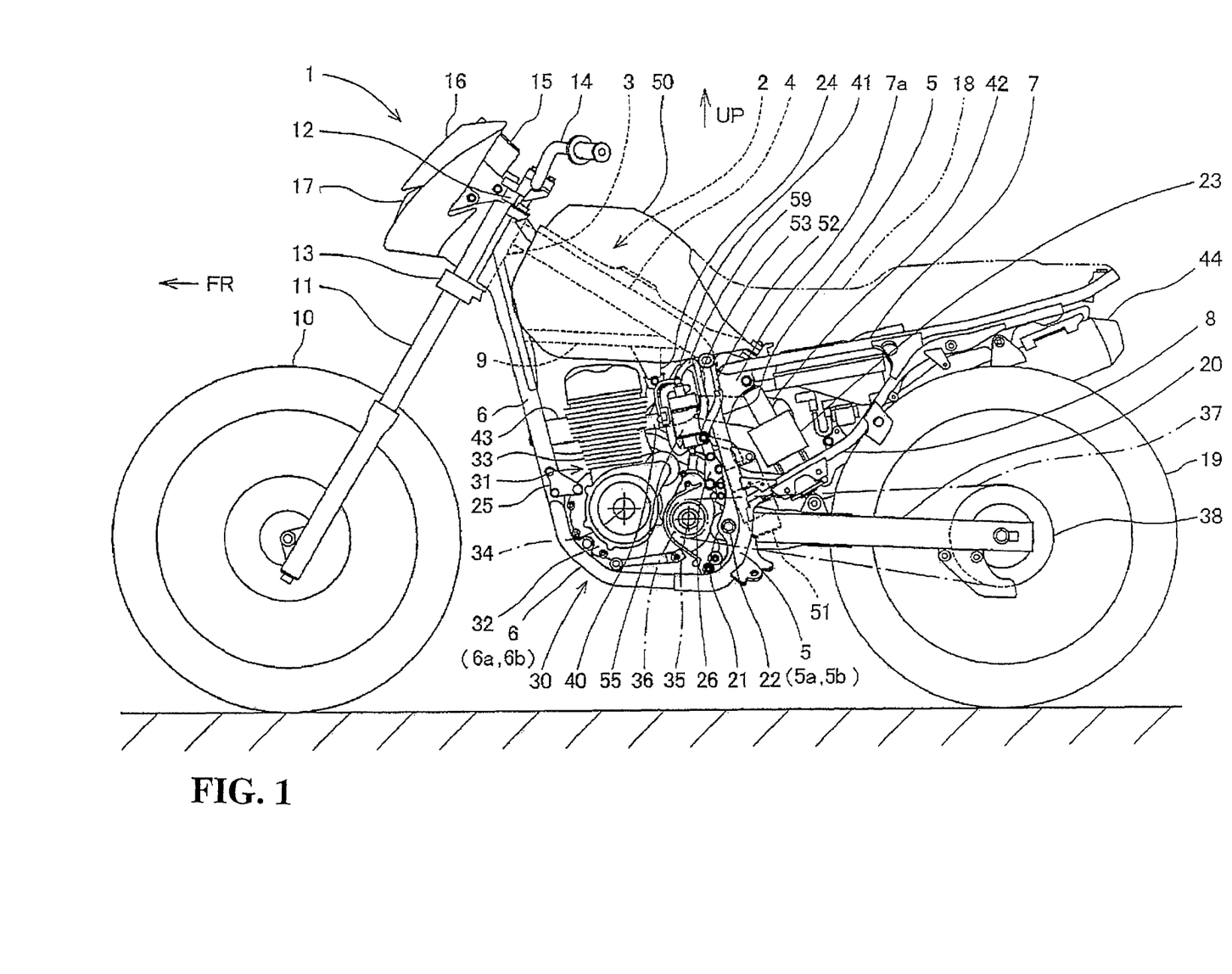
FIG. 1 is a side view showing a major part of a motorcycle having a fuel supply system for motorcycle according to an embodiment of the present invention.

FIG. 1 shows a major part of a left side view of a motorcycle 1 according to an embodiment of the present invention.

A body frame 2 of the motorcycle 1 includes: a head pipe 3; a single main frame 4 extending rearwardly downward from the head pipe 3 and is oriented along the front-rear direction of the vehicle; a center frame 5 extending downward from the rear end of the main frame 4; a down frame 6 extending downward from the head pipe 3; a pair of left and right seat stays 7 extending rearwardly upward from the main frame 4; a pair of left and right mid frames 8 connecting a portion near the lower end of the center frame 5 to the seat stays 7; and a reinforcing frame 9 interconnecting the down frame 6 and the main frame 4.

The center frame 5 is branched on the lower side relative to a joint portion for jointing to the main frame, into a pair of left center frame 5a and a right center frame 5b. The down frame 6 extends downward, and is branched on the lower side of a mounting portion of a front bracket 25 for supporting a power unit 30, into a pair of left down frame 6a and a right down frame 6b. The left down frame 6a and the right down frame 6b are bent to the rear side, and extend substantially horizontally, to be connected respectively to the lower ends of the left center frame 5a and the right center frame 5b.

In the following description, when it is unnecessary to separately point out a left member and a right member (of a left-right pair of members), the left and right members are collectively referred to simply as "the center frame 5," and "the down frame 6."

A front fork 11 for rotatably supporting the front wheel 10 is steerably supported by a steering stem (not shown) provided in head pipe 3, a top bridge 12 and a bottom bridge 13. A steering handle 14 is connected to the top bridge 12, and a meter unit 15 is mounted on the front side of the top bridge 12. A head light 17 covered by a cowl 16 is attached to the top bridge 12 and the bottom bridge 13. A seat 18 is mounted onto the seat stays 7.

At a rear portion of the center frame 5, the front end side of a swing arm 20 for rotatably supporting a rear wheel 19 is pivotally supported on pivot brackets 21 provided on the center frame 5, by a pivot shaft 22 extending in the vehicle width direction.

In addition, between a seat stay bracket 7a provided at a mounting portion of the seat stay 7 onto the main frame 4 and the swing arm 20, a rear shock absorber 23 is provided in a vertical orientation on the front side of the rear wheel 19, and the swing arm 20 is supported by the rear shock absorber 23 so as to be vertically swingable about the pivot shaft 22.

The power unit 30 is comprised of an internal combustion engine 31 constituting a front portion of the power unit 30, and a transmission (not shown) provided inside a crankcase 32 to constitute a rear portion of the power unit 30. The internal combustion engine 31 is a single-cylinder 4-stroke-cycle internal combustion engine, and its cylinder section 33 is provided to project upward from a front portion of the crankcase 32 in the state of being slightly slanted forward. In other words, the crankcase 32 constitutes a so-called power unit case.

The power unit 30 is supported by being suspended from an engine hanger boss 24 provided on the reinforcing frame 9, and its front and rear portions are supported by a front bracket 25 provided on the down frame 6 and a rear bracket 26 provided on the center frame 5, whereby the power unit 30 is mounted on the motorcycle 1, with the crankshaft 34 of the internal combustion engine 31 oriented in the vehicle width direction.

Power of the power unit 30 is transmitted from the crankshaft 34 through a clutch, a speed reducing mechanism and the like of the transmission (not shown), to be taken out through an output shaft 35 projecting out from a left side surface of a rear portion of the crankcase 32. The power is transmitted to the rear wheel 19 through a rear wheel drive sprocket 36 attached to the output shaft 35, a rear wheel drive chain 37, and a rear wheel driven sprocket 38 attached to the rear wheel 19.

The layout and configuration of the power unit and the fuel supply system in the motorcycle according to this embodiment will be described referring to FIG. 2, which is an enlarged side view of the vicinity of the power unit 30, and FIG. 3, which is a perspective view from a skew upper side taken along arrow III of FIG. 2 to show the vicinity of the power unit 30.

A throttle body 41 connected to an intake port through an intake pipe 40 and an air cleaner (not shown) connected to the throttle body 41 through a connecting tube 42 are provided at a rear portion of the cylinder section 33 of the internal combustion engine 31 in the power unit 30. A fuel injection system 45 (see FIG. 3) for injecting fuel is mounted on the throttle body 41.

An exhaust pipe 43 extending from an exhaust port is provided at a front portion of the cylinder section 33, extends rearward, and is connected to a muffler 44 provided at a rear portion. A spark plug 46 (FIG. 3) is provided at a right side surface of the cylinder section 33.

A fuel tank 50 is mounted to the main frame 4 in a straddling manner over the power unit 30. A fuel pump unit 51 is provided outside the fuel tank 50, and is fixed between the left and right center frames 5a and 5b. A fuel feed pipe 52 as a fuel passage for feeding the fuel from the fuel tank 50 to the fuel pump unit 51, and a fuel breather pipe 53 for returning surplus fuel or vapor from the fuel pump unit 51 to the fuel tank 50, are connected to the fuel pump unit 51.

In addition, the fuel pump unit 51 is disposed on the rear side of the crankcase 32, more specifically on the rear side of the output shaft 35 of the power unit 30, and on the front side of the rear shock absorber 21. A fuel filter device 55 is connected to the downstream side of a fuel discharge pipe 54 provided as a fuel passage for the fuel pressurized by and discharged from the fuel pump unit 51. The fuel filter device 55 is disposed on the lower side of the fuel tank 50 and on the upper side of the crankcase 32.

The fuel pump unit 51 is disposed substantially in the center of the vehicle width (see FIG. 4), is located on the vehicle inner side in the vehicle width direction relative to the swing arm 20, and is disposed at such a position as to overlap with the swing arm 20 as viewed along the vehicle width direction.

In addition, the fuel pump unit 51 is located at such a position so as to overlap with the left and right center frames 5a, 5b located on the rear side of the power unit 3, as viewed in the vehicle width direction.

In this embodiment, the fuel pump unit 51 is disposed on the rear side of the crankcase 32, more specifically on the rear side of the output shaft 35, and on the front side of the rear shock absorber 23. This ensures that the fuel pump unit 51 can be laid out efficiently, and, while the fuel pump unit 51 is disposed outside the fuel tank 50, the fuel filter device 55 connected to the fuel passage on the downstream side relative to the fuel pump unit 51 can be disposed on the upper side of the crankcase 32. Accordingly, a space saving in regard of the layout space for the fuel supply system is realized.

More particularly, in the case of a motorcycle using a gasoline-ethanol mix fuel, it is highly necessary to provide a fuel filter device on the downstream side of a fuel pump unit for the purpose of removing the dust present in ethanol. In that case, also, the above-mentioned space saving makes it possible to dispose the fuel pump unit outside a fuel tank, whereby the degree of freedom in design is enhanced.

In addition, the fuel pump unit 51 is likely to be protected by the swing arm 20, and the fuel pump unit 51 is likely to be protected by the vehicle body, such as the left and right center frames 5a, 5b.

Figure 2:
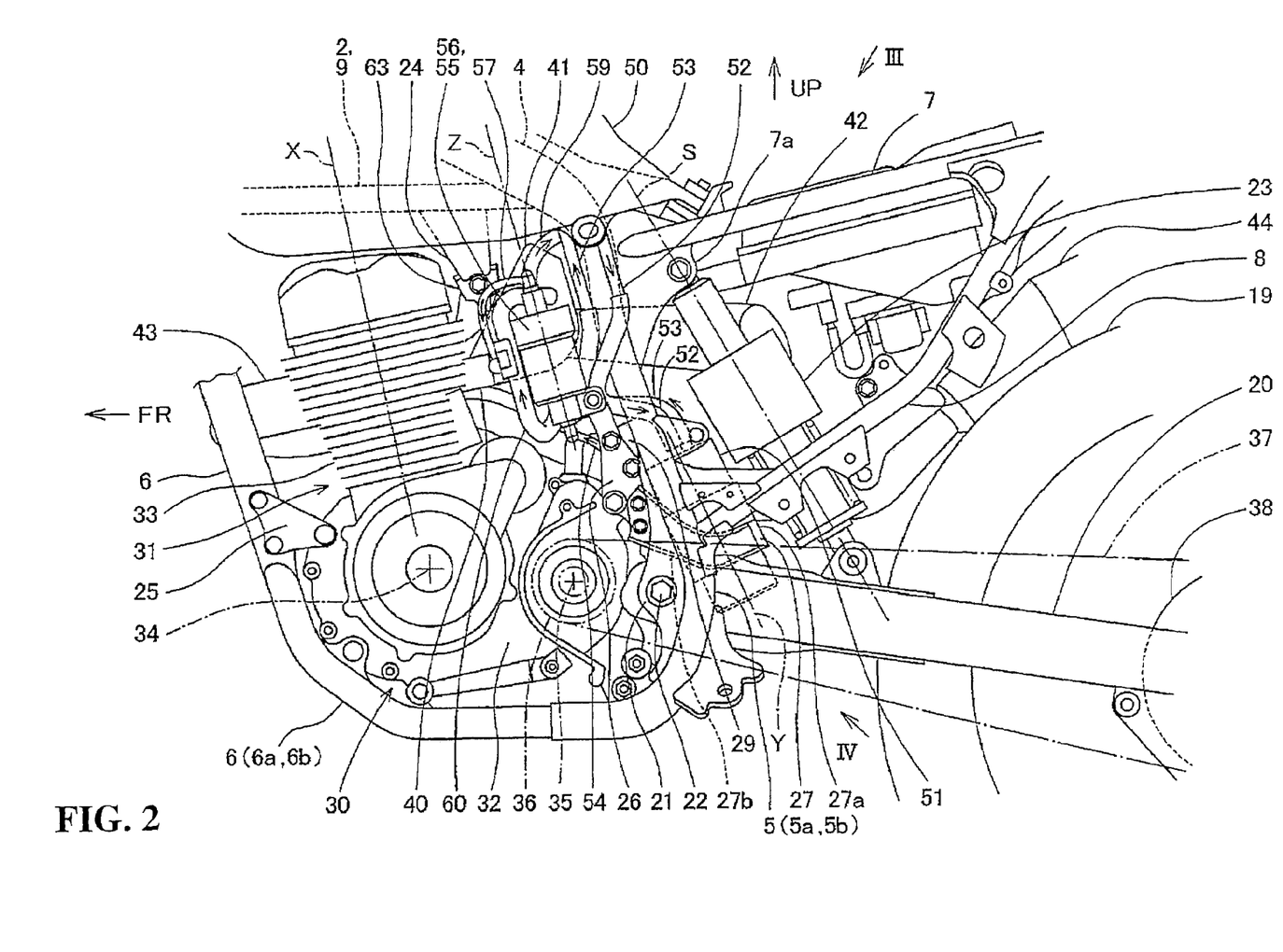
FIG. 2 is an enlarged side view of the vicinity of a power unit shown in the side view of FIG. 1.

As shown in FIG. 2, the fuel pump unit 51 is cylindrical in shape, and is disposed adjacently to the rear shock absorber 23, which is also cylindrical in shape. The cylinder axis Y of the fuel pump unit 51 and the cylinder axis S of the rear shock absorber 23 are vertically oriented substantially in parallel to each other. Consequently, the space on the front side of the rear cushion 23 is utilized effectively, and the fuel pump unit 51 is disposed in a compact form.

The internal combustion engine 31 has its crankshaft 34 oriented in the vehicle width direction, and the center axis X of the cylinder section 33 thereof is slightly slanted toward the forward side from the vertical. The cylinder axis Z of the fuel filter device 55 cylindrical in shape and the cylinder axis Y of the fuel pump unit 51 are oriented substantially in parallel to the cylinder axis X.

Since the cylinder section 33 and the fuel filter device 55 and the fuel pump unit 51 are disposed in this manner, in this embodiment, it is possible to lay out the power unit 30, the fuel filter device 55 and the fuel pump unit 51 in a compact form without leaving a dead space.

Figure 4:
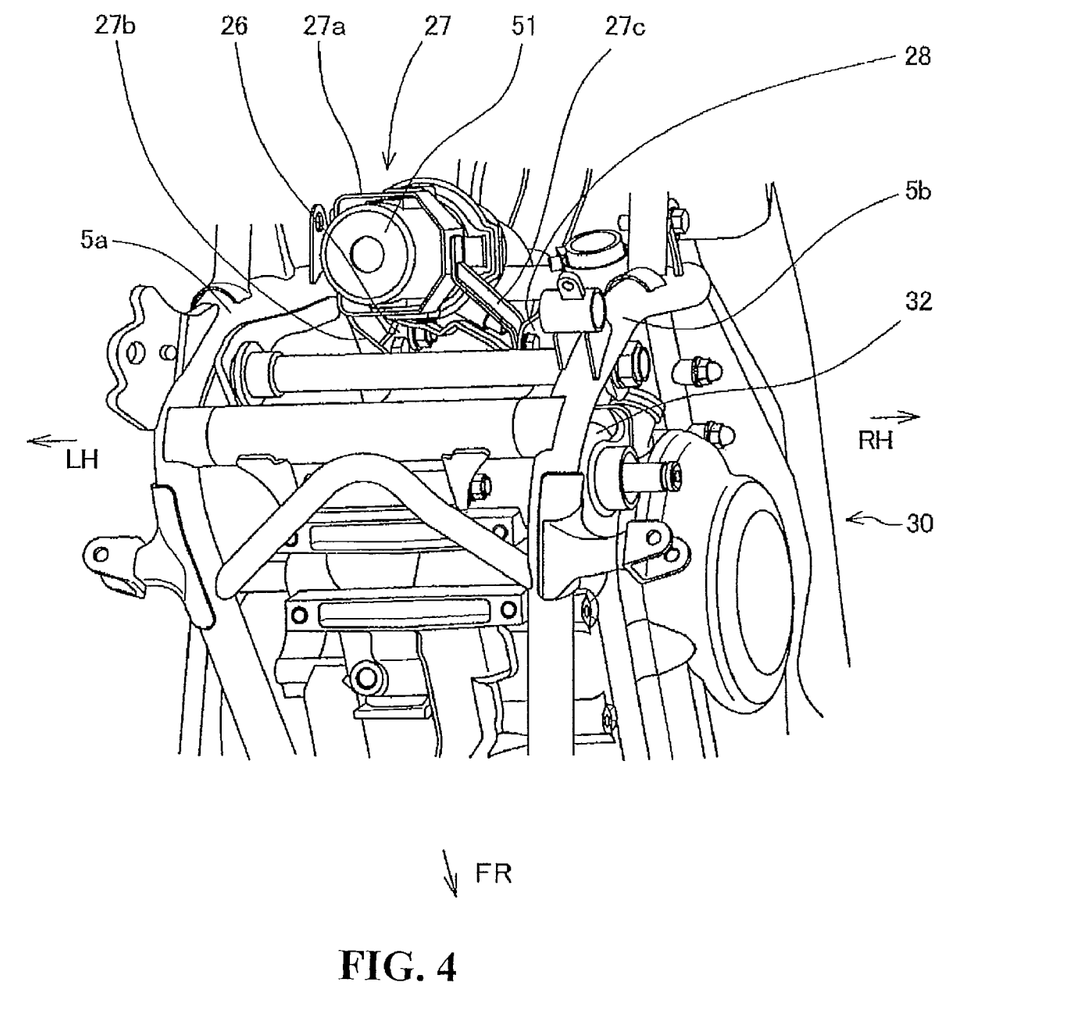
FIG. 4 is a perspective view from a skew lower side, taken along arrow IV of FIG. 2 to show a rear portion of the power unit and a fuel pump.

FIG. 4 is a perspective view, from a skew lower side, of a rear portion of the power unit 30 and the fuel pump unit 51, taken along arrow IV of FIG. 2. As shown in the FIG. 4, the fuel pump unit 51 is supported by a fuel pump mounting stay 27, which has an annular part 27a surrounding the fuel pump unit 51 and left and right arm parts 27b, 27c extending in the vehicle front-rear direction from the annular part 27a. The right arm part 27c is supported by a support member 28 provided on the side of the center frame 5, as shown in FIG. 4.

In addition, since the fuel filter device 55 is disposed on the upper side of the crankcase 32 as above-mentioned, a lower portion of the fuel filter device 55 is supported by the rear bracket 26 for supporting a rear portion of the crankcase 32, as shown in FIG. 2.

Since the fuel pump unit 51 is disposed below the fuel filter device 55, in a structure in which the left arm part 27b is attached to the rear bracket 26 as shown in FIG. 2, the left arm part 27b is supported by the crankcase 32 through the rear bracket 26.

The rear bracket 26 is supported by a rear bracket support member 29 provided on the side of the center frame 5.

In this embodiment as above-described, the fuel pump unit 51 is likely to be protected by the annular part 27a of the fuel pump mounting stay 27, and the fuel pump unit 51 is securely supported in a space-saving manner. In addition, the fuel pump mounting stay 27 for supporting the fuel pump unit 51 is made smaller in size, and the fuel pump unit 51 can be supported in a space-saving manner.

Figure 3:
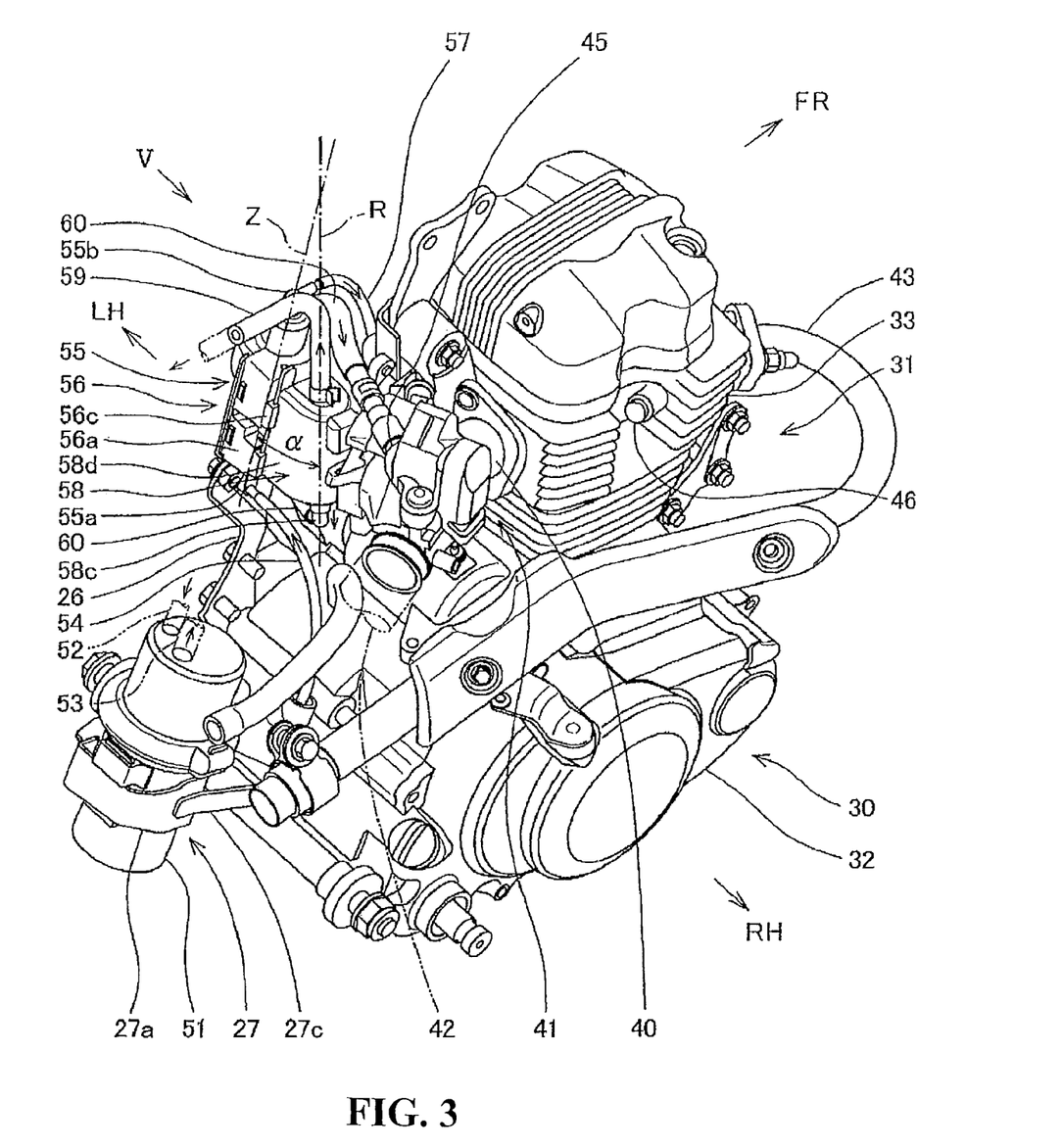
FIG. 3 is a perspective view from a skew upper side, taken along arrow III of FIG. 2 to show the layout of apparatuses in the vicinity of the power unit.

The fuel supply system in this embodiment includes: the fuel tank 50 shown in FIGS. 1 and 2; the fuel pump unit 51 connected to the fuel tank 50 through the fuel feed pipe 52 and the fuel breather pipe 53; the fuel filter device 55; a pressure regulator 58 shown in FIG. 3; and the fuel pipes constituting a fuel passage for connecting these components to one another. By the fuel supply system, the fuel is supplied to a fuel injection system 45 (FIG. 3) mounted on the throttle body 41.

The fuel pump unit 51 is connected through a fuel discharge pipe 54 to an inlet part 55a at a lower end portion of the fuel filter device 55, and a pressurized fuel is fed into the fuel filter device 55, whereby dust present in the fuel is removed.

The fuel filter device 55 has a cylindrical body part thereof (not shown) accommodated in an outer case 56, and has its cylinder axis Z oriented in a vertical direction. The outer case 56 is composed of a support part side case 56a and a cover part 56b, as will be described later.

An outlet part 55b at an upper portion of the fuel filter device 55 is connected through a fuel pipe 57 to an inlet part 53a (not shown in FIG. 3) (see FIGS. 6 and 7) at a vertically central portion of the pressure regulator 58, the pressurized fuel cleared of dust is fed into the pressure regulator 58, and the pressure of the fuel to be supplied to the fuel injection system 45 is regulated.

Figure 6:
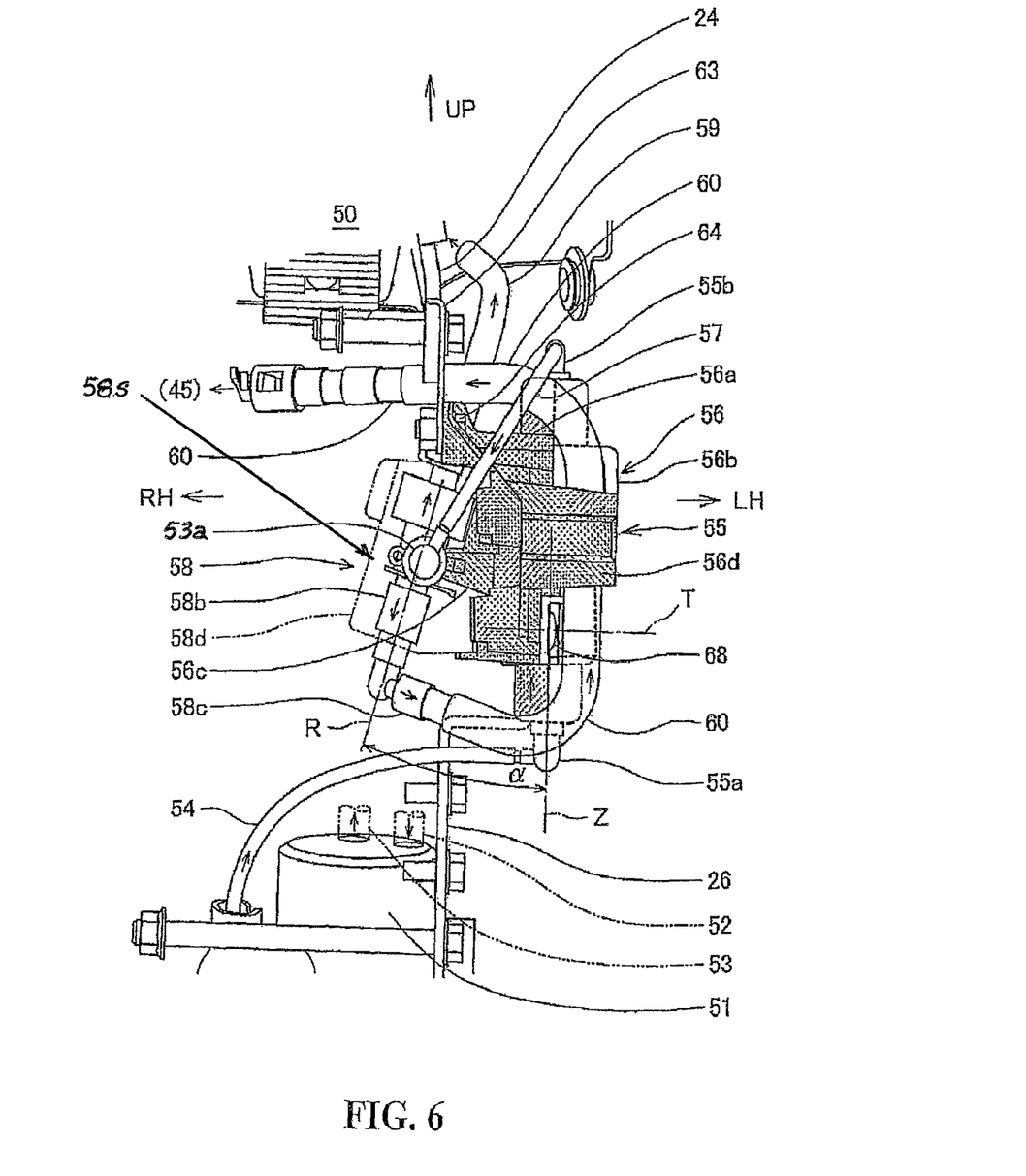
FIG. 6 is an apparatus layout illustration taken along arrows VI of FIG. 5, showing a condition where the power unit has been removed.

The pressure regulator 58 is located directly under the fuel tank 50 (see FIG. 6). As shown in FIG. 3, the pressure regulator 58 is disposed between the throttle body 41 and the fuel filter device 55 while being located on the upper side of a rear portion of the crankcase 32 and overlapping with the throttle body 41 when viewed in the vehicle width direction.

Figure 7:
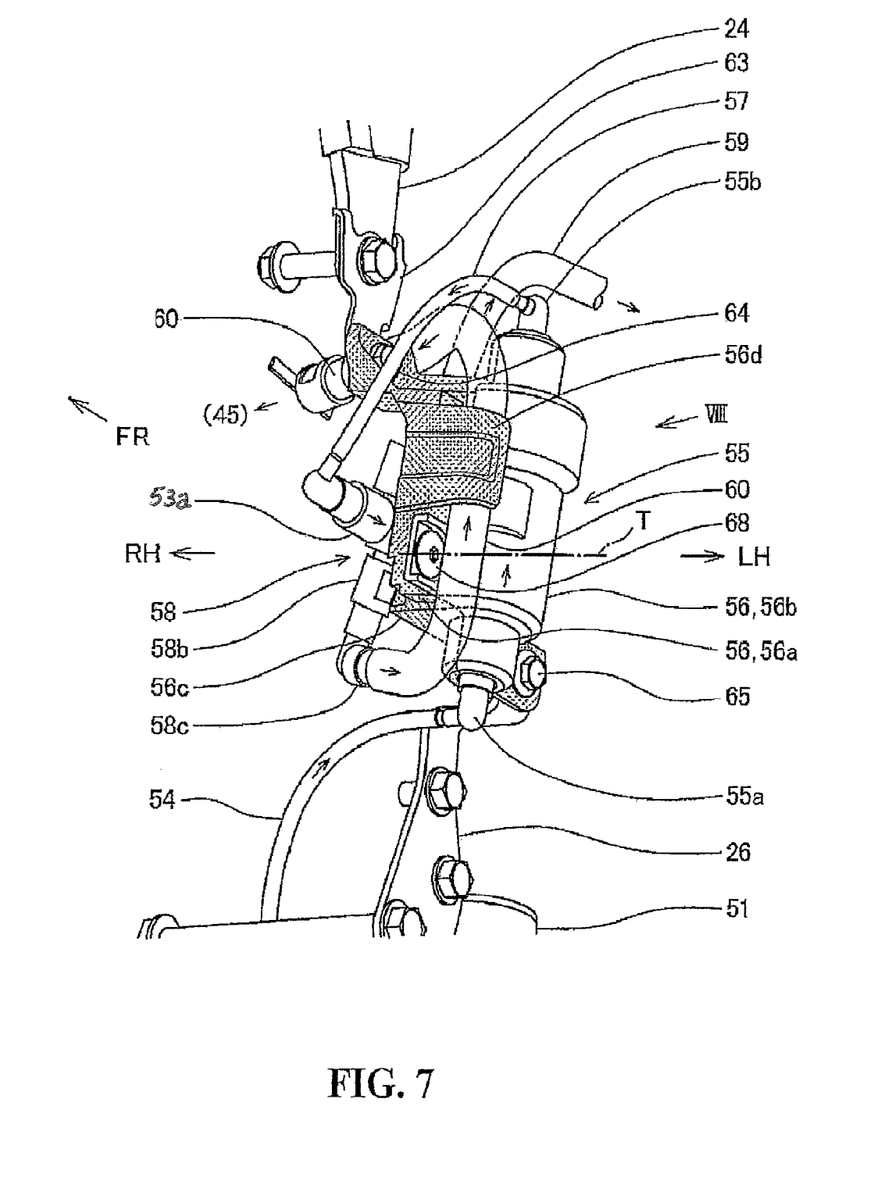
FIG. 7 is an apparatus layout illustration taken along arrow VII of FIG. 5, showing a condition where the power unit has been removed.

As shown in FIGS. 6 and 7, the pressure regulator 58 is fixed onto the outer case 56 in the state of being seated on a base part 56c (see FIG. 9) provided at an outside portion (on the inner side in the vehicle width direction) of the support part side case 56a of the outer case 56 of the fuel filter device 55, with the cylinder axis R of the cylindrical body part 58b thereof oriented in a vertical direction. In this instance, a side surface 58s of the pressure regulator 58 on the side opposite to the outer case 56 is covered with a cover member 58d attached to the outer case 56. The pressure regulator 58 shown in FIG. 3 is shown in the condition where the body part 58b thereof is covered with the cover member 58d, with the body part 58b itself is omitted from the drawing. FIGS. 6 and 7 show the pressure regulator 58 in the condition where the body part 58b is not covered with the cover member 58d.

In addition, the pressure regulator 58 is mounted to an outside portion of the fuel filter device 55 so that its cylinder axis R is inclined at an angle α (a small angle of not more than 45°) against the cylinder axis Z of the fuel filter device 55 in a plane along the vehicle width direction. Namely, the cylinder axes Z and R are not in parallel with each other but are intersecting with each other at an angle α (see FIG. 6), as viewed in the front-rear direction of the vehicle.

A surplus portion of fuel upon the pressure regulation is returned from a top portion of the pressure regulator 58 into the fuel tank 50 through a fuel return pipe 59. An outlet pipe 58c provided at a lower portion of the pressure regulator 58 is connected to the fuel injection system 45 through the fuel pipe 60, and the fuel regulated in pressure is supplied to the fuel injection system 45.

Figure 5:
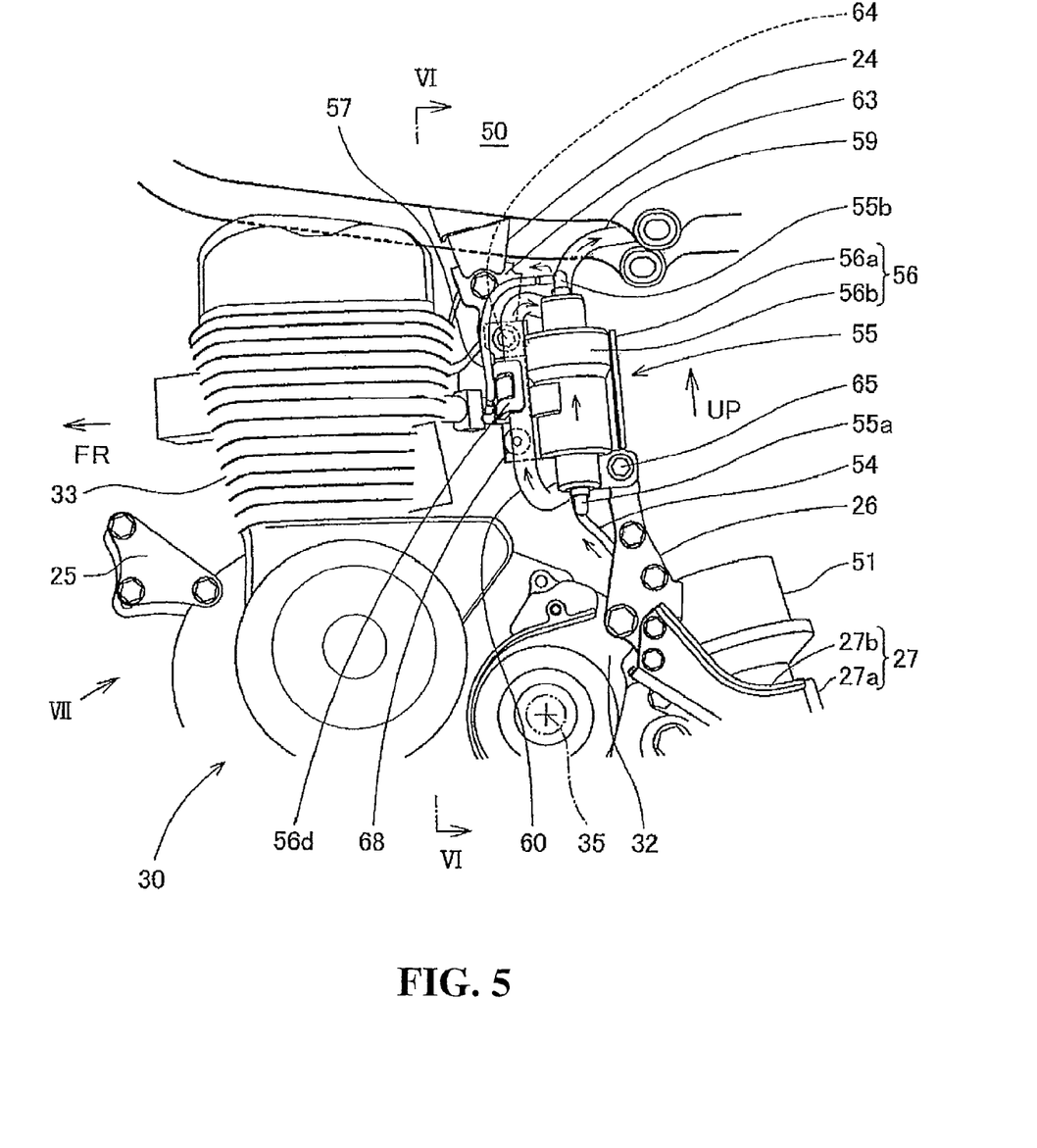
FIG. 5 is an apparatus layout illustration taken along arrow V of FIG. 3, showing a left side surface of the vicinity of the power unit.

As shown in FIGS. 5 to 7, the fuel pipe 60 is laid out so as to wind around the outer case 56 of the fuel filter device 55.

In the fuel supply system according to this embodiment as described above, the pressure regulator 58 is not incorporated in the fuel filter device 55, so that the outlet pipe 58c of the pressure regulator 58 can be laid out in an optimum position in relation to the layout of the fuel pipe 60 for the fuel having been regulated in pressure. In addition, since the cylinder axis R of the pressure regulator 58 is inclined against the cylinder axis Z of the fuel filter device 55, the winding-around of the fuel pipe 60 is facilitated, and optimization of the length of the fuel pipe 60 is facilitated. Moreover, with the pressure regulator 58 mounted to an outside portion of the fuel filter device 55, the pressure regulator 58 is arranged in a space-saving manner while being disposed outside the fuel filter device 55.

More particularly, in the case of a motorcycle using a gasoline-ethanol mix fuel, the length of the fuel pipe between a fuel filter device and a fuel injection system must be optimized so as to secure a buffer capacity for permitting a fuel injection control device to appropriately recognize a change in the composition of the fuel supplied to the fuel injection system upon a change made in the ethanol concentration according to the operating conditions. In this connection, according to this embodiment of the present invention, the length of the fuel pipe 60 between the pressure regulator 58 and the fuel injection system 45 is optimized, whereby an effective buffer effect is produced. The space saving ensures that the fuel pump unit can also be disposed outside the fuel tank 50, in addition to the fuel filter device 55 which is highly needed to be installed outside the fuel tank 50 for enhancing maintainability, in the case of the fuel mix.

On the other hand, with the pressure regulator 58 disposed between the fuel filter device 55 and the throttle body 41 so as to be hidden when externally viewed along the vehicle width direction, the pressure regulator 58 is likely to be protected, and appearance of the motorcycle 1 is improved.

The pressure regulator 58 can be supported outside the fuel filter device 55 by a simple structure composed of the base part 56c of the outer case 56 of the fuel filter device 55 and the cover member 58d covering the base part 56c. Thus, the pressure regulator 58 can be protected.

The pressure regulator 58 is disposed directly under the fuel tank 50, with its cylinder axis R oriented along a vertical direction, with the fuel return pipe 59 disposed on the upper side, and with the outlet pipe 58c disposed on the lower side. As a result, the fuel return pipe 59 between the pressure regulator 58 and the fuel tank 50 and the fuel pipe 60 between the pressure regulator 58 and the fuel injection system 45 are laid out in a space-saving manner, and the length of the fuel pipe 60 is secured.

The layout and configuration of apparatuses in the fuel supply system according to this embodiment will be described more in detail below, based on FIG. 5, which is an apparatus layout illustration taken along arrow V of FIG. 3 to show a left side view of the vicinity of the power unit 30, FIG. 6, which is an apparatus layout illustration taken along arrow VI of FIG. 5, FIG. 7, which is an apparatus layout illustration taken along arrow VII of FIG. 5, and FIG. 8, which is a perspective view of the fuel filter device 55, taken along arrow VIII of FIG. 7.

As shown in FIG. 2, the fuel filter device 55 is disposed at a position somewhat deviated to the left side from the center of the vehicle width, in the state of overlapping with the throttle body 41 as viewed in the vehicle width direction.

Further, as shown in FIGS. 5 to 7, an upper portion of the outer case 56 of the fuel filter device 55 is supported through an auxiliary bracket 63 to an engine hanger boss 24 provided for fixing the power unit 30 to the body frame 2 (reinforcing frame 9).

The auxiliary bracket 63 fixed to the engine hanger boss 24 extends downward, and the upper portion of the outer case 56 is fastened to the auxiliary bracket 63 by an upper portion support bolt 64.

A lower portion of the outer case 56 is fastened by a lower portion support bolt 65 to the rear bracket 26 provided for fixing a rear portion of the crankcase 32 to the center frame 5, and is thereby supported on the crankcase 32. The rear bracket 26 is fixed to the center frame 5 through the rear bracket support member 29 (FIG. 2).

More specifically, the outer case 56 is composed of the support part side case 56a on the inner side in the vehicle width direction and the cover part 56b on the outer side in the vehicle width direction which covers the support part side case 56a, in a mounted condition. With the upper and lower portions on the support part side case 56a side of the outer case 56 fastened in the above-mentioned manner, the support part side case 56a is supported by the engine hanger boss 24 and the crankcase 32.

Figure 8:
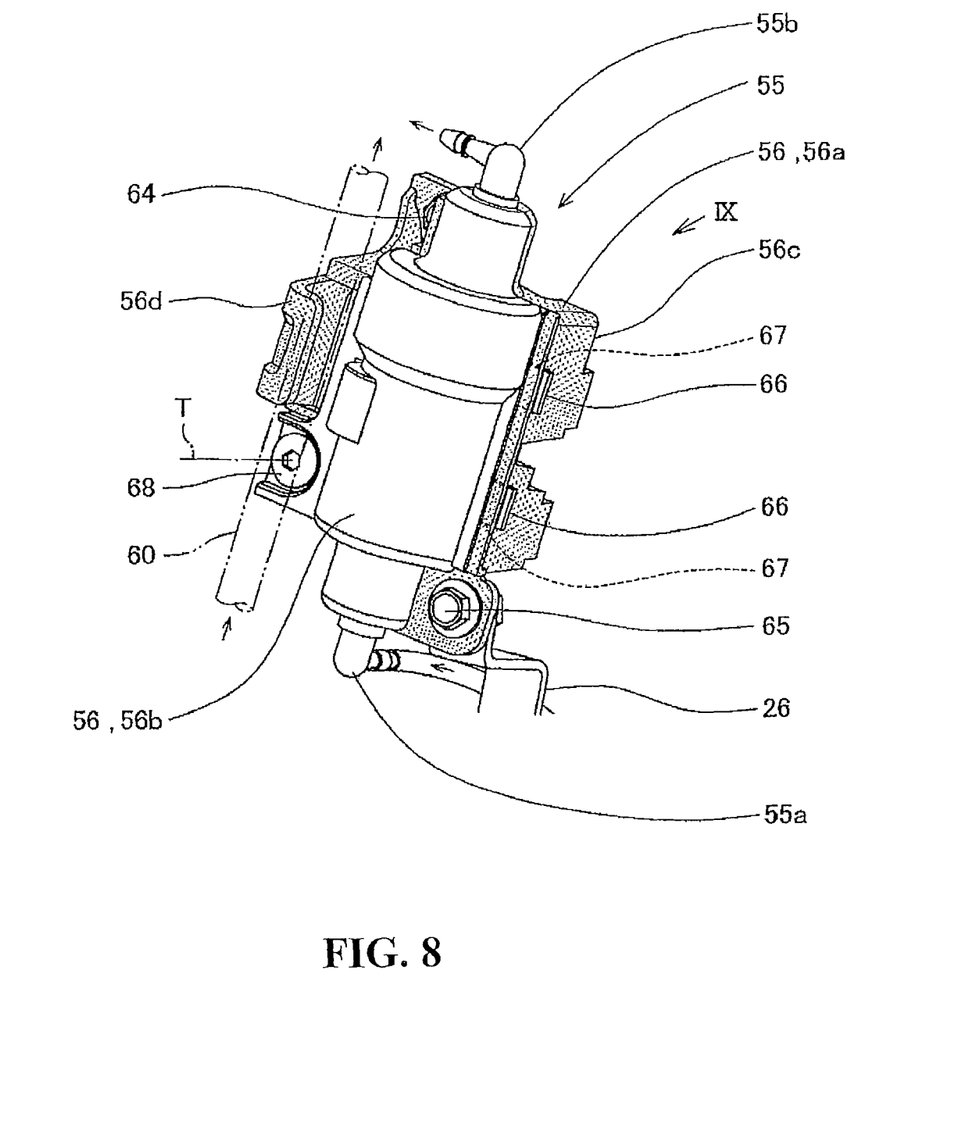
FIG. 8 is a perspective view of a fuel filter device, taken along arrow VIII of FIG. 7.

In addition, as shown in FIG. 8, the cover part 56b is provided with claw portions 66 on one end side thereof. After the claw portions 66 are inserted into engaging holes 67 provided on one end side of the support part side case 56a accommodating a fuel filter body part (not shown), the other end side of the cover part 56b is fastened to the other end side of the support part side case 56a by a fastening bolt 68, whereby the cover part 56b is fixed to the support part side case 56a, and the fuel filter body part (not shown) is also fixed in the outer case 56.

Figure 9:
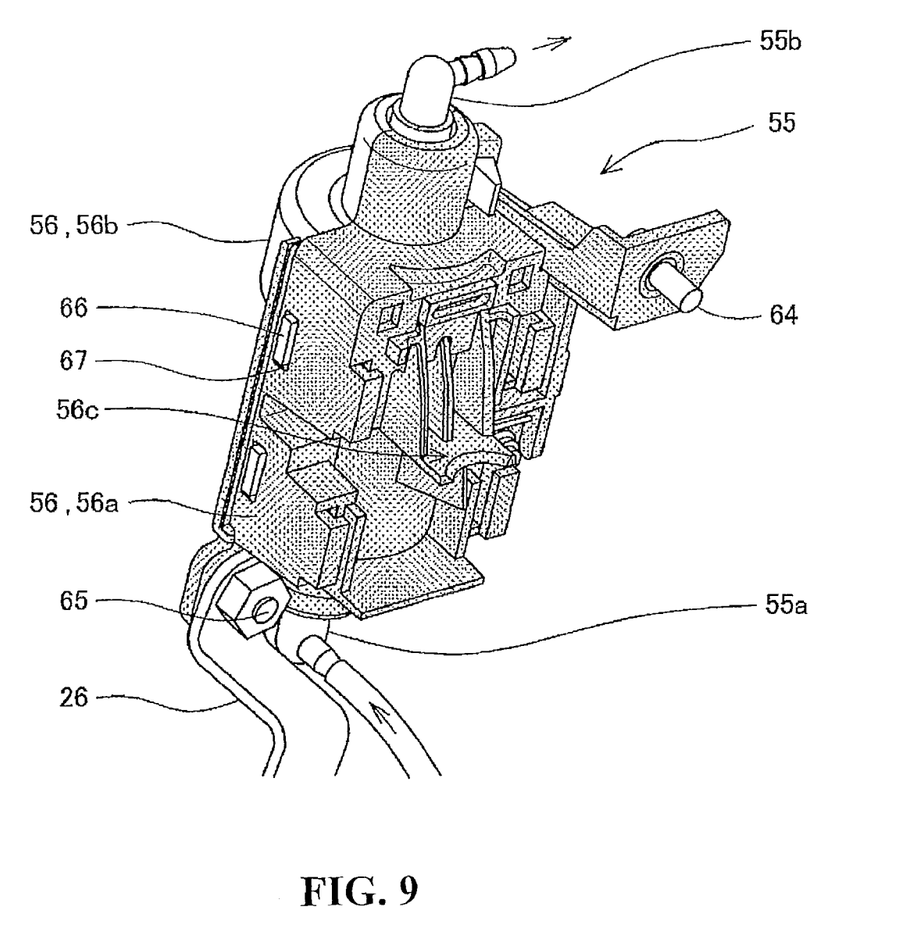
FIG. 9 is a perspective view of the fuel filter device, taken along arrow IX of FIG. 8 to show an outside portion where a base part for seating a pressure regulator thereon is formed.

As shown in FIG. 9, the support part side case 56a is provided with the above-mentioned base part 56c at an outside portion (on the inner side in the vehicle width direction) thereof. The base part 56c is formed slantly so that the body part 58b of the pressure regulator 58 is seated with its cylinder axis R inclined at the angle α against the cylinder axis Z of the fuel filter device 55, as shown in FIG. 6.

According to this embodiment as above, the fuel filter device 55 is disposed in a space at a lateral side of the throttle body 41 in a space-saving manner, and the upper and lower portions of the outer case 56 thereof are supported, so that the fuel filter device 55 is firmly supported.

More particularly, since the support part side case 56a on the inner side in the vehicle width direction is supported by the engine hanger boss 24 and the crankcase 32, the fuel filter device 55 is firmly supported. In addition, the cover part 56b is fixed to the support part side case 56a by the claw portions 66 and the fastening bolt 68 on the outer side in the vehicle width direction. Accordingly, the cover part 56b is easy to mount and dismount, so that maintenance and replacement works for a fuel filter element in the fuel filter body part, etc. are facilitated.

This is particularly effective in the case of a fuel supply system in a motorcycle using a gasoline-ethanol mix fuel where enhancement of maintainability of a fuel filter device 55 is highly in demand.

In this embodiment, the fuel pipe 60 connectingly extending from the outlet pipe 58c of the pressure regulator 58 to the fuel injection system 45 is provided so as to wind around the outer case 56 of the fuel filter device 55.

Therefore, while the pipe length of the fuel pipe 60 from the outlet pipe 58c of the pressure regulator 58 to the fuel injection system 45 is secured and optimization of the pipe length is contrived, the fuel pipe 60 can be laid along the fuel filter device 58, whereby the fuel pipe 60 can be arranged in a space-saving manner.

In addition, the fuel pipe 60 set winding around the outer case 56 of the fuel filter device 55 is supported on the outer case 56 by a pipe support part 56d provided at the support part side case 56a of the outer case 56, and is located so as to be adjacent to a head portion of the fastening bolt 68 for fastening the cover part 56b to the support part side case 56a, in the bolt axis direction T.

Therefore, the fuel pipe 60 laid winding around the outer case 56 is supported by the pipe support part 56d so as to be adjacent to the head portion of the fastening bolt 68 in the bolt axis direction T. Accordingly, even when the fastening bolt 68 is loosened, it is held by the fuel pipe 60, so that the fastening bolt 68 is prevented from slipping off.

As above-mentioned, it is necessary for the fuel pipe between the fuel filter device and the fuel injection system to be optimized in length so as to have an appropriate buffer capacity, and this necessity is particularly strong in the case of a motorcycle using a gasoline-ethanol mix fuel, for example.

In the case where there is a limit to the regulation of a fuel pipe between a fuel filter device and a pressure regulator, for example, in the case where the pressure regulator 58 is mounted at an outside portion of the fuel filter device 55 as in this embodiment, since there is a limitation as to the length of the fuel pipe 57 between the fuel filter device 55 and the pressure regulator 58, it is effective to optimize the length (partial length) of the fuel pipe 60 between the pressure regulator 58 and the fuel injection system 45, instead of optimizing the whole length of the fuel pipe connectingly extending from the fuel filter device 55 to the fuel injection system 45.

The fuel tank 50 in this embodiment is mounted, in a straddling manner, on the main frame 4 (body frame 2) oriented in the front-rear direction of the vehicle.

Figure 10A:
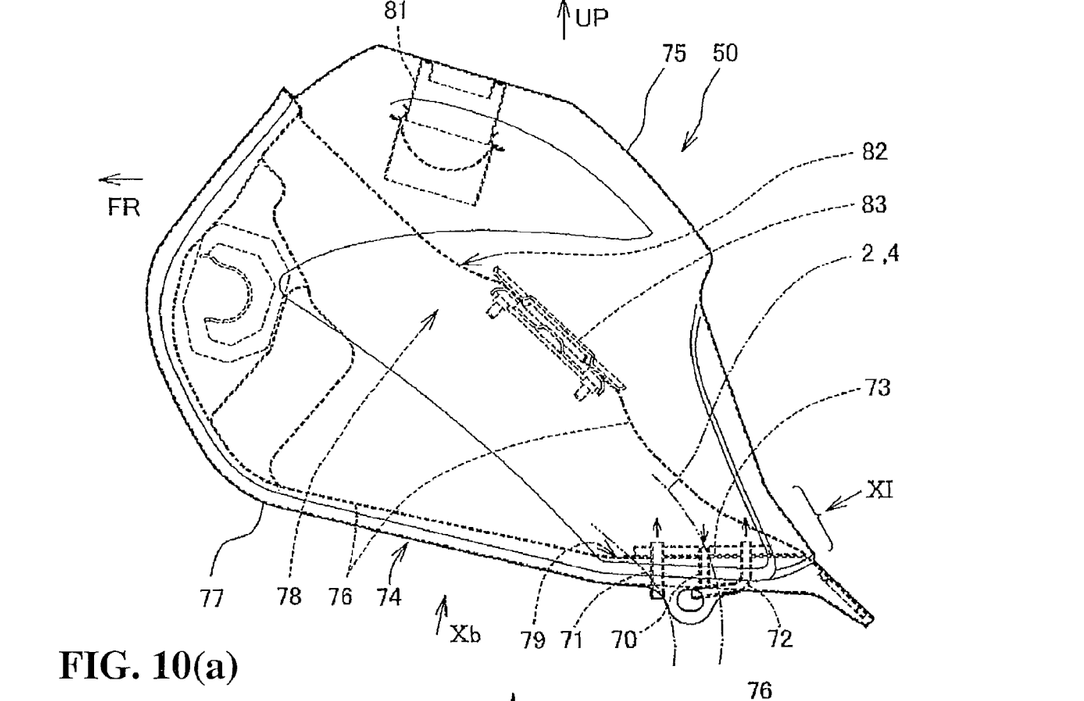
FIG. 10(a) is a side view of a fuel tank according to this embodiment.
Figure 10B:
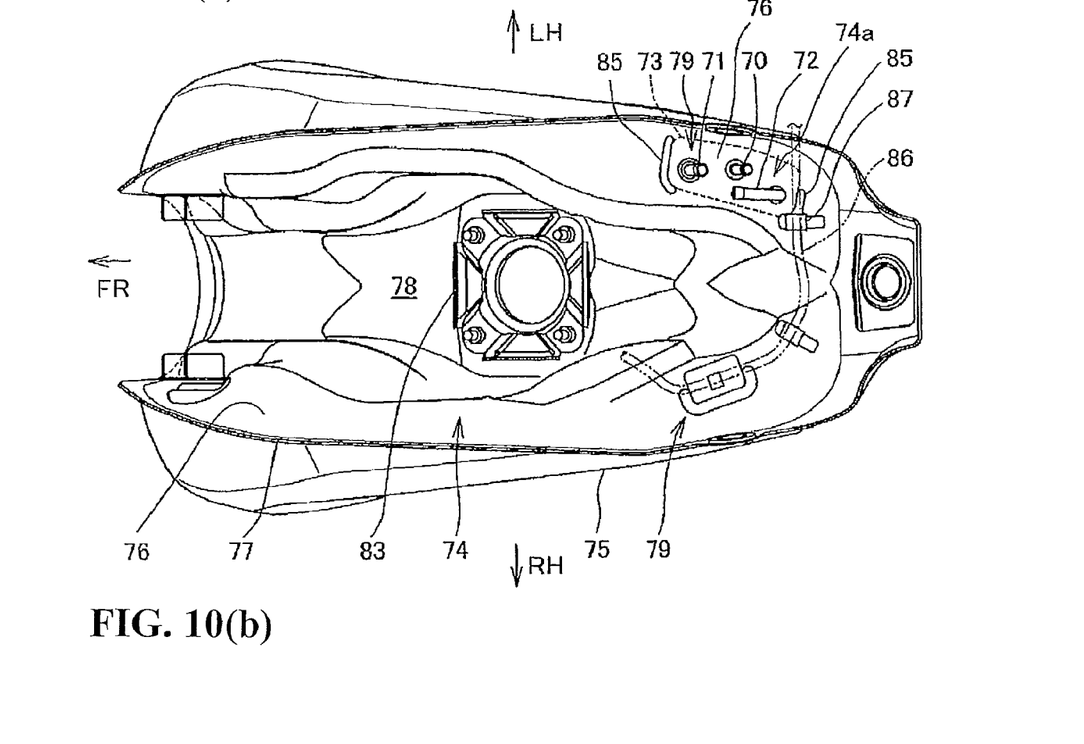
FIG. 10(b) is a general bottom view of the fuel tank, taken along arrow Xb of FIG. 10(a)

As shown in FIGS. 10(a) and 10(b), the fuel tank 50 is provided with three joints, namely, a feed joint 70, a breather joint 71, and a return joint 72.

Figure 11A:
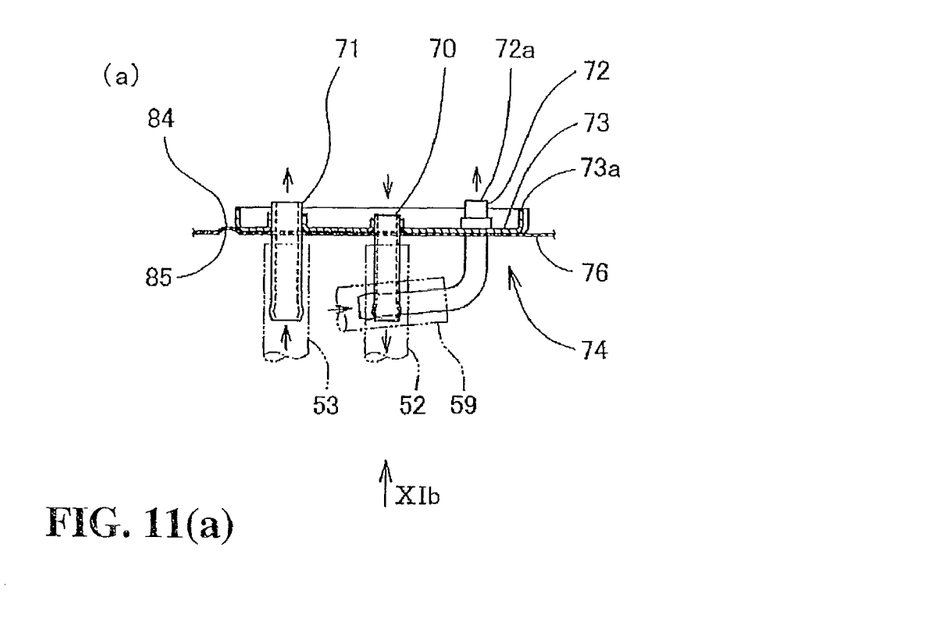
FIG. 11(a) is a sectional side view of the vicinity of a reinforcing plate, or area XI of FIG. 10(a)
Figure 11B:
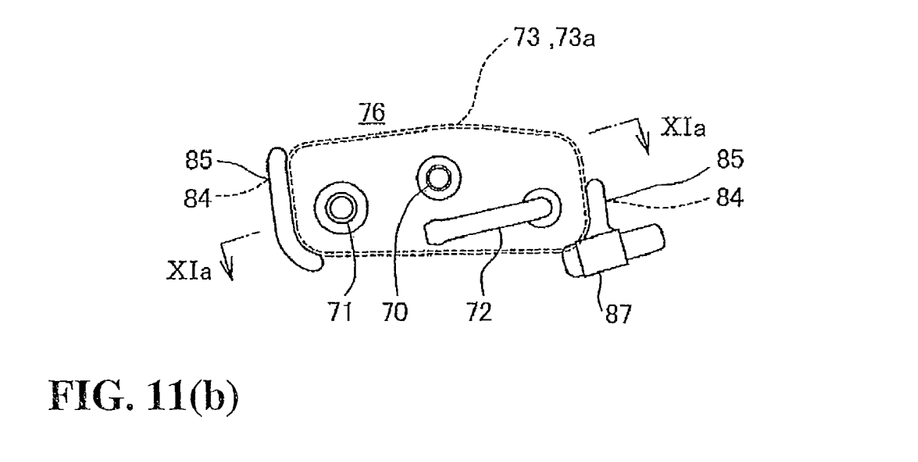
FIG. 11(b) is a partial bottom view of the fuel tank in the vicinity of the reinforcing plate, taken along arrow XIb of FIG. 11(a).

As shown in FIGS. 11(a) and 11(b) (see FIG. 2), the feed joint 70 is connected to the fuel pump unit 51 (see FIG. 2) through the fuel feed pipe 52, and the fuel fed from the fuel tank 50 to the fuel pump unit 51 passes therethrough. The breather joint 71 is connected to the fuel pump unit 51 through the fuel breather pipe 53, and the fuel returned from the fuel pump unit 51 to the fuel tank 50 passes therethrough. The return joint 72 is connected through the fuel return pipe 59 to the pressure regulator 58 (see FIG. 6) provided on the downstream side of the fuel pump unit 51, and the fuel that is returned from the pressure regulator 58 to the fuel tank 50 passes therethrough.

In addition, as shown in FIGS. 10(a), 10(b), 11(a) and 11(b), the three joints are fixed to the fuel tank 50 by letting them penetrate a single reinforcing plate 73, and are arranged concentratedly at a lowermost part of a bottom portion 74 of the fuel tank 50.

In the fuel supply system according to this embodiment as above-described, the three joints, namely, the feed joint 70, the breather joint 71 and the return joint 72 provided at the fuel tank 50 are reinforced by the single reinforcing plate 73, so that the number of component parts is reduced, and fixation of the three joints to the fuel tank 50 is facilitated. In addition, in the motorcycle 1 having the fuel pump unit 51 and the fuel filter device 55 provided outside the fuel tank 50, the rigidity of pipe portions outside the fuel tank is secured, and a compact pipe layout is permitted, so that space saving as to the fuel supply system can be contrived.

More particularly, in a fuel supply system for a motorcycle using a gasoline-ethanol mix fuel wherein the arrangement of a fuel filter device 55 outside a fuel tank 50 is highly needed for facilitating maintenance of the fuel filter device 55, the above-described space saving enables not only the fuel filter device 55 but also the fuel pump unit 51 to be arranged outside the fuel tank, leading to an enhanced degree of freedom in design.

In addition, the plurality of joints 70, 71, 72 can be reinforced by the small reinforcing plate 73. Thus, the dead residue of fuel in the fuel tank 50 can be reduced.

The fuel tank 50 in this embodiment is comprises of an upper plate part 75 forming an upper surface in a shape resembling an inverted bowl and a bottom plate part 76 closing the lower side of the upper plate part 75 and forming the bottom portion 74. The upper and lower plate parts 75 and 76 are welded to each other at their lower edges 77 in a liquid-tight manner. The bottom plate part 76 is provided, at the middle in the vehicle width direction, with a recessed part 78 extending in the front-rear direction of the vehicle and recessed upward in a tunnel-like shape, for permitting the main frame 4 oriented in the vehicle front-rear direction to pass therethrough. The bottom plate part 76 extends downward on both lateral sides of the recessed part 78, to form side bottom parts 79. Thus, the fuel tank 50 as a whole is inverted U-shaped in section in the vehicle width direction.

As shown in FIG. 10(*b*), the recessed part 78 is so formed that its width decreases toward the rear side of the vehicle; therefore, at the bottom portion 74*a* on the vehicle rear side, at least one of the left and right side bottom parts 79 is formed to be flat in a required width. As shown in FIG. 10(*a*), at a position where the side bottom part 79 overlaps with the main frame 4 (body frame 2) as viewed in the vehicle width direction, the three joints consisting of the feed joint 70, the breather joint 71 and the return joint 72 are concentrated to the side bottom part 79 and are fixed to the fuel tank 50 by the single reinforcing plate 73.

The upper plate part 75 of the fuel tank 50 is provided with a fuel filler port 81 at an upper portion thereof. A ridge 82 formed inside the fuel tank 50 by the recessed part 78 of the bottom plate part 76 is provided with a support member 83 for a fuel level sensor (not shown), nearly at the middle in the front-rear direction of the vehicle.

Therefore, in this embodiment, while forming the bottom portion 74 of the fuel tank 50 in a compact form, the space for fixing the reinforcing plate 73 can be secured at the bottom portion 74 of the fuel tank 50. Thus, a space saving as to the fuel supply system can be achieved.

In addition, as shown in FIG. 10(*b*), the reinforcing plate 73 is formed so as to extend along the shape of the side bottom part 79, resulting in that positioning of the reinforcing plate 73 is facilitated. Thus, mutual distances of the joints 70, 71 and 72 can be secured. Since the three joints 70, 71 and 72 are arranged in a row along the front-rear direction of the vehicle, the side bottom parts 79 of the fuel tank 50 can be made narrower, and the bottom portion 74 as a whole can be made smaller in width.

In addition, as shown in FIG. 10(*a*), of the three joints 70, 71 and 72, the return joint 72 is arranged so as to open into the fuel tank 50 at a higher position as compared with the other joints 70 and 71. This ensures that a terminal opening part 72*a* (see FIG. 11(*a*)) of the return joint 72 for the fuel returned from the pressure regulator 58 can be set at an uppermost portion of the three joints. Thus, a preventive effect on the flowing-in of dust present in the fuel tank 50 into the pressure regulator 58 can be enhanced.

This is particularly effective in the case of the above-mentioned gasoline-ethanol mix fuel.

As shown in detail in FIGS. 11(*a*) and 11(*b*), the reinforcing plate 73 in this embodiment is provided at its periphery with a reinforcing rib 73*a*, and is fixed to the inner surface side of the fuel tank 50 by brazing or the like, with the reinforcing rib 73*a* directed to the inside of the fuel tank 50. For mounting the reinforcing plate 73, the bottom plate part 76 forming the bottom portion 74 of the fuel tank 50 is provided with a protuberant portion 84 for positioning the reinforcing plate 73 on the inside surface of the bottom portion 74.

The reinforcing plate 73 is mounted and fixed, using the protuberant portion 84 as a guide. At the time of press forming the protuberant portion 84, a dent 85 is formed in the outside surface of the bottom portion 74. A clip 87 for fixing a wiring 86 from the fuel level sensor (not shown) or a piping is provided at the position of the dent 85.

Therefore, the presence of the dent 85 formed in the outside surface of the bottom portion 74 of the fuel tank 50 can provide two functions, namely, a function of positioning the reinforcing plate 73 on the inside surface of the bottom portion 74 of the fuel tank 50 and a function of fixing the wiring 86 or piping by the clip 87 on the outside surface of the bottom portion 74 of the fuel tank 50.

In addition, for the purpose of reducing the dead residue of fuel in the fuel tank 50, the uppermost portion of the feed joint 70 is set to be lower than the reinforcing rib 73*a*.

While the fuel supply system for the motorcycle 1 according to an embodiment of the present invention has been described above, the invention is not limited to the fuel supply system for the motorcycle 1 as described in the embodiment above. As a fuel supply system, the invention is applicable to, and can be carried out effectively in, various forms of motorcycles including a power unit having a crankcase of an internal combustion engine, a fuel injection system mounted to the power unit, a fuel tank, a fuel pump unit by which a fuel in the fuel tank is supplied to the fuel injection system, and a fuel filter device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel supply system for a motorcycle comprising:
   a power unit having a crankcase of an internal combustion engine;
   a fuel injection system mounted to the power unit;
   a fuel tank;
   a fuel pump unit arranged outside the fuel tank, wherein fuel in the fuel tank is supplied to the fuel injection system;
   a fuel filter device;
   wherein the fuel filter device is cylindrical in shape;

a pressure regulator cylindrical in shape is mounted to an outside portion of the fuel filter device, a cylinder axis of the pressure regulator being inclined at an angle α with respect to a cylinder axis of the fuel filter device; and a first fuel pipe extending between an outlet part at an upper portion of the fuel filter device to an inlet part at a central portion along a length of the pressure regulator, wherein the fuel pump unit is held in place by a mounting stay having an annular part and a right arm part, the right arm part extending from the annular part to a support member that is attached to a right center frame of the motorcycle, wherein the fuel filter device includes an outer case with a support part side case provided on an inner side in a vehicle width direction and a cover part provided on an outer side in the vehicle width direction and covering the support part side case, wherein the fuel filter device is mounted on the motorcycle;

the support part side case is supported by an engine hanger boss, for fixing the power unit to a body frame of the motorcycle, and the crankcase; and the cover part is fixed to the support part side case wherein a claw portion provided on its one end side is inserted into the support part side case and its other end side is fastened to the support part side case by a fastening bolt, and wherein a lower portion of the outer case is fastened by a support bolt to a rear bracket provided for fixing a rear portion of the crankcase to the left center frame of the motorcycle, and is thereby supported on the crankcase, and the rear bracket is fixed to the left center frame by a rear bracket support member.

2. The fuel supply system for the motorcycle according to claim 1, wherein the fuel injection system is mounted on a throttle body mounted to the power unit, and the pressure regulator is disposed between the throttle body and the fuel filter device so as to overlap with the throttle body when viewed in a vehicle width direction.

3. The fuel supply system for the motorcycle according to claim 1, further comprising:

a second fuel pipe extending from the outlet pipe of the pressure regulator to the fuel injection system in a connecting manner is provided so as to wind around an outer case of the fuel filter device.

4. The fuel supply system for the motorcycle according to claim 1, wherein the fuel filter device is disposed on the lower side of the fuel tank and on the upper side of the crankcase, and the fuel is supplied to the fuel filter device through a fuel discharge pipe extending upwardly from the fuel pump unit to an inlet part at a lower end portion of the fuel filter device.

5. The fuel supply system for the motorcycle according to claim 1, wherein the pressure regulator is disposed directly under the fuel tank in a condition in which its cylinder axis is oriented in a vertical direction, a fuel return pipe for returning the fuel to the fuel tank is attached to its upper portion, and the outlet pipe is arranged at its lower portion.

6. The fuel supply system for the motorcycle according to claim 1, wherein a cylinder axis Y of the fuel pump unit and a cylinder axis S of a rear cushion are substantially vertically oriented in positions that are substantially parallel to each other, a cylinder axis X of a cylinder section of the internal combustion engine is slightly slanted toward a forward side from a vertical direction, a cylinder axis Z of the fuel filter device and the cylinder axis Y of the fuel pump unit are oriented substantially parallel to the cylinder axis X of the cylinder section.

7. The fuel supply system for the motorcycle according to claim 1, wherein the fuel pump unit is arranged behind a rear-most side of the crankcase in a position entirely below the fuel filter device.

8. The fuel supply system for the motorcycle according to claim 1, wherein fuel pump unit is mounted in a position that is midway across the motorcycle in a lateral direction, and the fuel filter device is mounted in a position on a left side of the motorcycle.

9. The fuel supply system for the motorcycle according to claim 1, wherein a lower portion of an outer case of the fuel filter device is fastened by a lower portion support bolt to a rear bracket provided for fixing a rear portion of the crankcase to a center frame of the motorcycle.

10. A fuel supply system adapted for use with a motorcycle comprising:

a fuel tank;

a fuel pump unit, arranged outside the fuel tank, for supplying fuel to a fuel injection system;

a fuel filter device;

a pressure regulator mounted to an outside portion of the fuel filter device and having a longitudinal axis inclined at an angle α with respect to a longitudinal axis of the fuel filter device; and a first fuel pipe extending between an outlet part at an upper portion of the fuel filter device to an inlet part at a central portion along a length of the pressure regulator, wherein the motorcycle includes a swing arm mounted on a pivot shaft, and the fuel pump unit is arranged such that the lower portion thereof is located directly behind a central portion of the pivot shaft, wherein the fuel pump unit is held in place by a mounting stay having an annular part and a right arm part, the right arm part extending from the annular part to a support member that is attached to a right center frame of the motorcycle.

11. The fuel supply system adapted for use with the motorcycle according to claim 10, wherein the fuel filter device is disposed on the lower side of the fuel tank and on the upper side of the crankcase, and the fuel is supplied to the fuel filter device through a fuel discharge pipe extending upwardly from the fuel pump unit to an inlet part at a lower end portion of the fuel filter device.

12. The fuel supply system for the motorcycle according to claim 1, further comprising:

a second fuel pipe extending from an outlet pipe of the pressure regulator to the fuel injection device and being in communication therewith, wherein the pressure regulator is fixed to an outer case of the fuel filter device in a condition in which the body part of the pressure regulator is seated on a base part extending outwardly from a central portion of the outer case, and a side surface of the pressure regulator is opposite to a portion of the outer case that is covered with a cover member attached to the outer case of the fuel filter device.

13. The fuel supply system for the motorcycle according to claim 1, a lower portion of an outer case is fastened by a lower portion support bolt to a rear bracket extending downwardly from the outer case,
  the rear bracket being provided for fixing a rear portion of the crankcase to a center frame, and being thereby supported on the crankcase.

14. The fuel supply system adapted for use with the motorcycle according to claim 10, further comprising:
  a second fuel pipe extending from an outlet pipe of the pressure regulator to the fuel injection device and being in communication therewith,
  wherein the pressure regulator is fixed to an outer case of the fuel filter device in a condition in which the body part of the pressure regulator is seated on a slanted base part extending outwardly from a central portion of the outer case, and
  a side surface of the pressure regulator is opposite to a portion of the outer case that is covered with a cover member attached to the outer case of the fuel filter device.

15. The fuel supply system for the motorcycle according to claim 10, wherein the fuel pump unit is arranged behind a rear-most side of the crankcase in a position entirely below the fuel filter device.

16. The fuel supply system for the motorcycle according to claim 10, wherein fuel pump unit is mounted in a position that is midway across the motorcycle in a lateral direction, and the fuel filter device is mounted in a position on a left side of the motorcycle.

17. The fuel supply system for the motorcycle according to claim 10,
  wherein the fuel filter device includes an outer case with a support part side case provided on an inner side in a vehicle width direction and a cover part provided on an outer side in the vehicle width direction and covering the support part side case, wherein the fuel filter device is mounted on the motorcycle;
  the support part side case is supported by an engine hanger boss, for fixing the power unit to a body frame of the motorcycle, and the crankcase; and
  the cover part is fixed to the support part side case,
  wherein a claw portion provided on its one end side is inserted into the support part side case and its other end side is fastened to the support part side case by a fastening bolt, and
  wherein a lower portion of the outer case is fastened by a support bolt to a rear bracket provided for fixing a rear portion of the crankcase to the left center frame of the motorcycle, and is thereby supported on the crankcase, and
  the rear bracket is fixed to the left center frame by a rear bracket support member.

18. The fuel supply system for the motorcycle according to claim 10, wherein the fuel filter device includes an outer case provided with a pipe support part, the fuel supply system further comprising:
  a second fuel pipe provided so as to wind around the outer case of the fuel filter device is supported by the pipe support part which holds the second fuel pipe against a cylindrically-shaped outer side wall of the outer case,
  the pipe support part being located adjacent to a head portion of a fastening bolt for fastening the cover part to the support part side case.

* * * * *